(12) United States Patent
Faghri et al.

(10) Patent No.: US 7,625,649 B1
(45) Date of Patent: Dec. 1, 2009

(54) VAPOR FEED FUEL CELLS WITH A PASSIVE THERMAL-FLUIDS MANAGEMENT SYSTEM

(75) Inventors: Amir Faghri, Mansfield, CT (US); Zhen Guo, Storrs Mansfield, CT (US)

(73) Assignee: University of Connecticut, Farmington, CT (US)

( * ) Notice: Subject to any disclaimer, the term of this patent is extended or adjusted under 35 U.S.C. 154(b) by 616 days.

(21) Appl. No.: 11/441,427

(22) Filed: May 25, 2006

(51) Int. Cl.
   *H01M 8/04* (2006.01)
   *H01M 8/10* (2006.01)
(52) U.S. Cl. .......................................... 429/26; 429/30
(58) Field of Classification Search ................... 429/26, 429/30, 34, 44, 86
   See application file for complete search history.

(56) References Cited

U.S. PATENT DOCUMENTS

| | | | |
|---|---|---|---|
| 4,885,218 A * | 12/1989 | Andou et al. ............. | 429/86 X |
| 5,322,744 A * | 6/1994 | Koseki ...................... | 429/30 X |
| 5,350,643 A * | 9/1994 | Imahashi et al. .......... | 429/30 X |
| 5,534,363 A * | 7/1996 | Sprouse et al. ................. | 429/34 |
| 6,334,881 B1 * | 1/2002 | Giannetta et al. ............. | 55/486 |
| 6,447,941 B1 | 9/2002 | Tomimatsu .................. | 429/26 |
| 6,468,681 B1 * | 10/2002 | Horiguchi ..................... | 429/26 |
| 6,596,422 B2 | 7/2003 | Ren | |
| 6,630,266 B2 | 10/2003 | Hockaday et al. | |
| 6,632,553 B2 | 10/2003 | Corey et al. | |
| 6,696,189 B2 | 2/2004 | Bostaph et al. | |
| 6,727,016 B2 | 4/2004 | Bostaph et al. | |
| 6,737,181 B2 | 5/2004 | Beckman et al. | |
| 6,808,838 B1 | 10/2004 | Wilson | |
| 2004/0062980 A1 | 4/2004 | Ren et al. | |
| 2004/0091763 A1 | 5/2004 | Drake | |
| 2004/0209136 A1 | 10/2004 | Ren et al. | |
| 2004/0209154 A1 | 10/2004 | Ren et al. | |
| 2005/0003256 A1 | 1/2005 | Malhotra | |
| 2005/0008923 A1 | 1/2005 | Malhotra | |
| 2005/0008924 A1 | 1/2005 | Malhotra | |
| 2005/0056641 A1 | 3/2005 | Drake et al. | |
| 2005/0058874 A1 | 3/2005 | Drake et al. | |
| 2005/0058879 A1 | 3/2005 | Guay | |
| 2005/0081924 A1 | 4/2005 | Manning et al. | |
| 2005/0084720 A1 | 4/2005 | Becerra et al. | |
| 2005/0170224 A1 * | 8/2005 | Ren et al. ................. | 429/34 X |
| 2006/0046123 A1 * | 3/2006 | Guo et al. ..................... | 429/34 |

OTHER PUBLICATIONS

Blum, A., Duvdevani, T., Philosoph, M., Rudoy, N., Peled, E. (2003) "Water-neutral Micro Direct Methanol Fuel Cell (DMFC) for Portable Applications," *Journal of Power Sources*, vol. 117, pp. 22-25.

(Continued)

*Primary Examiner*—Stephen J. Kalafut
(74) *Attorney, Agent, or Firm*—McCarter & English, LLP

(57) ABSTRACT

The invention provides a fuel cell system, such as a direct methanol fuel cell (DMFC) that uses passive approaches to thermal-fluids management. In accordance with one embodiment of the invention, a fuel cell is provided that uses a passive fuel delivery system. In accordance with another embodiment of the invention, a fuel cell is provided that passively transports water from the cathode or an external source to the anode. In accordance with still another embodiment of the invention, a fuel cell is provided that passively directs heat to an evaporation pad to facilitate evaporation of fuel. In accordance with still another embodiment of the invention, a fuel cell is provided that provides passive carbon dioxide gas management.

8 Claims, 15 Drawing Sheets

OTHER PUBLICATIONS

Luharuka, R., Wu, C.F., Hesketh, P.J. (2004) "Design, Fabrication, and Testing of a Near Constant Pressure Fuel Delivery System for Miniature Fuel Cells," *Sensors and Actuators A,* vol. 112, pp. 187-195.

Chandak, M.V., Lin, Y.S., Ji, W., Higgins, R.I. (1998) "Sorption and Diffusion of Volatile Organic Compounds in Polydimethylsiloxane Membranes," *Journal of Applied Polymer Science,* vol. 67, pp. 165-175.

Chang, H. (2003) "Technical and Commercial Issues of DMFC: 5 W for Mobile Devices and 100W for Portable Power," 5th Annual International Symposium-Small Fuel Cells for Portable Power Applications, May 7-9, Hyatt Regency, New Orleans, LA, USA.

Hockaday, R.G. (2003b) "Small Diffusion Driven Fuel Cells," The Knowledge Foundation's 5th Annual International Symposium—Small Fuel Cells for Portable Power Applications, May 7-9, Hyatt Regency, New Orleans, LA, USA.

Thrasher, S., Rezac, M.E. (2004) "Transport of Water and Methanol Vapors in Alkyl Substituted Poly(norbornene)," *Polymer,* pp. 2641-2649.

Jeanne S. Pavio (2002) "MicroFuel Cells for Portable Electronics", DMFC Technology Motorola Labs, (11 pages).

Jaesung Han, Eun-Sung Park, "Direct methanol fuel-cell combined with a small back-up battery", Journal of Power Sources 112, (2002) pp. 477-483.

A. Heinzel, V.M. Barragan, "A review of the state-of-the-art of the methanol crossover in direct methanol fuel cells", Journal of Power Sources 84 (1999) 70-74.

Daejin Kim, et al., "Recent progress in passive direct methanol fuel cells at KIST", Journal of Power Sources 130 (2004) 172-177(available online at www.sciencedirect.com).

Chenggang Xie, Joseph Botaph, Jeanne Pavio, "Development of a 2 W direct methanol fuel cell power source", Journal of Power Sources 136 (2004) 55-65.

Zhaobin Wei, et al., "Influence of electrode structure on the performance of a direct methanol fuel cell", Journal of Power Sources 106 (2002) 364-369.

* cited by examiner

Fuel from the fuel tank

VAPOR FEED FUEL CELLS WITH A PASSIVE THERMAL-FLUIDS MANAGEMENT SYSTEM

BACKGROUND OF THE INVENTION

1. Field of the Invention

The present invention relates to vapor feed fuel cells with passive thermal-fluids management features. The present invention is particularly useful in applications such as direct methanol fuel cells

2. Description of Related Art

Miniature direct methanol fuel cells (DMFCs), which promise high energy densities and instant refueling, present beneficial opportunities for use as power sources for small mobile devices (e.g., notebook computers, personal digital assistants, music systems and cellular telephones). Although extensive research and industrial efforts have focused on development of miniature DMFCs in recent years, there is still no truly commercial miniature DMFC product available for consumer electronic devices so far. Typically, it has been difficult to provide an ancillary system that ensures effective power generation processes in a miniature DMFC platform. One of the fundamental limitations to faster development of direct methanol fuel cell technology is methanol crossover. Methanol crossover is the process by which methanol is transported, by diffusion and electro-osmosis, from the anode through the electrolyte to the cathode, where it reacts directly with the oxygen, producing no current from the cell. Furthermore, methanol has a poisoning effect on the cathode catalyst that results in reduced cell performance. The methanol crossover rate is roughly proportional to the methanol concentration at the anode; therefore, to reduce methanol crossover, it is necessary to regulate the methanol feed concentration. In practice, the fuel supplied to the anode of the DMFC must be a very dilute aqueous methanol solution (usually 2~6 vol % methanol). If the methanol concentration is too high, the methanol crossover problem will significantly reduce the efficiency of the fuel cell (Heinzel and Barragan, 1999). This effect exacerbates the difficulties associated with transporting a sufficient water supply to the anode. It is very clear that carrying water in the system significantly reduces the overall system energy density. It is also well known that a forced air design with an external blower is unattractive for use in small fuel cell systems, as the parasitic power losses from the blower are estimated at 20-25% of the total power output.

The conventional approaches to these problems can be divided into two categories: "active" and "passive". An active system requires moving parts such as a pump or fan to feed fuel and oxygen into the fuel cell stack. Conversely, a passive fuel cell system supplies fuel to the anode in a passive manner requiring no external power or moving parts. A series of active DMFC prototypes has been developed at Motorola Labs (Pavio, 2002; Xie et al., 2004). These systems are composed of the following components: fuel cell stack, methanol sensor, $CO_2$ separator, electronic controls, methanol feed pump, circulation pump and pump drivers. The appropriate methanol concentration is maintained by dosing neat methanol from a methanol cartridge into the recirculation anode liquid. This DMFC design is difficult to create because of the complexity in miniaturizing all the required system components and integrating them into a small unit required for portable applications. In addition, system components add considerable cost to the fuel cell system and consume considerable electricity from the fuel cell, in turn significantly reducing the net power output of the fuel cell. As a result, the actively driven DMFC is not competitive, relative to conventional battery technology, in terms of cost and power output.

One alternative to actively driven systems is passive DMFC systems. Certainly, a number of diverging passive methods have been developed to overcome the difficulties associated with fuel delivery issues, each with its own merits and limitations as shown in Table 1. The passive approaches to this problem can be divided into three categories:

(1) Those utilizing a dilute methanol solution contained in larger fuel reservoirs;

(2) Those utilizing an optimized structure for the fuel cell's electrodes and polymer electrolyte membrane to reduce methanol crossover, permitting use of a highly concentrated methanol solution;

(3) Those utilizing a pervaporation membrane, which effects a phase change from the liquid methanol contained within a fuel reservoir to a vaporous fuel that is presented to the anode aspect of the catalyzed membrane electrolyte.

1. Low Concentrated Methanol Solution Feed (LCMSF)

The simplest method involves utilizing reservoirs containing methanol/water mixtures at the anode (Kim et al., 2004; Han and Park, 2002; Wei et al., 2002). This passive method, has the advantage of system simplicity. It is disadvantageous in that carrying a dilute methanol solution results in a significant penalty to the energy density of the fuel cell. Kim et al. (2004) developed a passive DMFC system having a total active area of 27.0 $cm^2$, which is composed of two planar stacks with a fuel reservoir sandwiched between them. With a 4.0 M aqueous methanol solution, the system produced a power output of 1.0 W at room temperature. Han and Park (2002) used a 4.0 M methanol solution to feed the fuel cell stack. For operation over an extended period of time, they used a large reservoir to eliminate the effect of the changing of methanol concentration. The problem with this approach is that it requires that the system carry a significant amount of water along with the methanol in the cartridge. Carrying a dilute methanol solution in the reservoir, of a composition well under 100% methanol, results in a significant penalty in energy density of the power system.

2. Low Methanol Crossover Polymer Electrolyte Membrane (LMC-PEM)

Toshiba—In U.S. Pat. No. 6,447,941, granted to Toshiba in 2002, the company disclosed a mechanism to deliver liquid methanol fuel by capillary action into the cell. The fuel is then vaporized by heat within the cell and supplied to the fuel electrode, thereby generating electric power (Tomimatsu et al., 2002). The liquid fuel tank is equipped with a pressure control mechanism for introducing a required amount of the liquid fuel from a liquid outlet port into the unit cell.

"The new DMFC adopts a "passive" fuel supply system which feeds methanol directly into the cell. In developing a passive DMFC, Toshiba found a solution to the potential problem of "methanol crossover," in which methanol and oxygen combine without an energy-producing reaction. The company has optimized the structure of the fuel cell's electrodes and polymer electrolyte membrane that trigger the reaction. This approach allows use of a highly concentrated methanol solution as a fuel, which also overcomes a major obstacle to small fuel cells: achieving a very small fuel tank."—http://www.pcworld.com/news/article/0,aid,113844,00.asp Hitachi—"Hitachi's prototype uses a methanol concentration of around 20 percent, although the company plans to raise this to around 30 percent by the time it becomes a commercial product."—http://www.dpreview.com/news/0406/04062401toshibafuel.asp Samsung—"A lot of the development work surrounds the membrane at the heart of the fuel cell and the catalyst employed. Miniaturizing the DMFC and extending its life means using a higher concentration of methanol, although that has caused problems with the membrane and some wastage of methanol.

Samsung says its fuel cell uses a new membrane that halts more than 90 percent of methanol crossover and also uses a catalyst made of mesoporous carbon, cutting by half the amount of catalyst required."—http://www.pcworld.com/news/article/0,aid,115549,00.asp Chang from Samsung developed a low methanol crossover electrolyte membrane, which maintained the same proton conductivity and near 30% crossover vs. Nafion® when 5M or higher concentrations of methanol were used (Chang, 2003).

3. Phase-Changing Pervaporation Membrane (PCPM)

MTI MicroFuel Cells Inc.—has actively pursued passive fuel delivery technology for micro DMFCs since the company was established in 2001. In the MTI design, a non-porous thin film of silicone is used as a methanol vapor delivery membrane (see FIG. 1A). The silicone thin film used in the MTI invention is a polydimethylsiloxane (PDMS) membrane (Ren et al, 2004a). This membrane has excellent processing ability for making ultra-thin composite membranes. PDMS membranes exhibit selective transport for organic molecules with respect to polar molecules such as water and low molecular weight gases such as nitrogen, oxygen, and helium (Chandak et al., 1998; Hockaday et al., 2003a, b, Thrasher and Rezac, 2004). The permeation of methanol through a PDMS membrane involves three physical processes: (1) sorption of liquid methanol molecules at the feed side of the membrane, (2) diffusion of the dissolved methanol through the membrane, and (3) desorption of methanol vapor from the permeate side. Methanol vapor condenses at the anode and keeps the local methanol concentration next to the catalyzed anode surface at about 3% (1M), or below, which is the concentration level for the anode reaction to proceed with minimal methanol loss due to crossover.

Fuel cell systems based on this type of technology can be completely passive as long as water produced in the system can be reused by means of materials and structures. However, there are two fundamental limitations with this approach. First, as methanol evaporates from the permeate side of the methanol pervaporation membrane, the membrane will cool down. Water will condense on the permeate side of the membrane if its temperature is below the saturation temperature. A thin film of water will be formed on the surface, which will drop the fuel vapor pressure and reduce the rate at which fuel can vaporize out. Secondly, the fuel supply rate is difficult to control. Such controlled adjustment of the rate of liquid fuel delivery is an important key for achieving high fuel utilization in a passive DMFC. To overcome these disadvantages, a new fuel delivery system was proposed by the company (See FIG. 1B). "By using a parallel network of tubes of a sufficiently small diameter, relatively high linear flow of methanol within each narrow tube is achieved at some given overall fuel feed rate demanded by the anode. The linear liquid flow rate could then be made much greater than the linear rate of water diffusing back into the feed tube from any liquid water, which may collect in the evaporation pad during cell operation. This effectively prevents diffusion of water generated at the cell electrode back to the fuel reservoir, which back diffusion, if left unchecked, could result in dilution of the highly concentrated fuel, causing feed of fuel of variable concentration."— (Ren et al., 2005). This fuel delivery system is actually an actively driven system.

Manhattan Scientifics Inc.—also utilizes "selectively permeable membrane" technology. The membrane is highly permeable to fuel over water. The inventors in U.S. Pat. No. 6,630,266 also called this process as "per-evaporation" (Hockaday et al., 2003a). "The process of enhancing the selective vaporization of fuel from a membrane is called per-evaporation. It essentially increases the evaporation of that fuel. Thus the ampoule membrane uses this effect when the fuel concentration is low. It keeps the fuel concentration higher at the fuel cell than it would be without the fuel ampoule selectively permeable barrier."

"By having a selectively permeable fuel tank wall, such as silicone rubber, the fuel delivery has the advantageous effect of delivering fuel at a constant rate throughout its life cycle. If the membrane had similar permeability to fuel compared to water, the water would be diffusing in while the fuel was diffusing out. The water would drop the fuel vapor pressure and reduce the rate at which fuel can diffuse out. Thus, the rate of fuel delivery would gradually drop and the fuel tank would gradually fill with a mixture of fuel and water."

"In product applications it is desirable to have the membrane be effectively much more permeable to fuel compared to water. Thus, it is a "one-way" diffusion process and the rate would not change until the fuel tank is emptied of fuel. Our measurements on silicone rubber membranes show a molecular diffusion rate difference for methanol over water of 20 to 36 times. In performance tests with a small ampoule containing 95% methanol with a silicone rubber membrane the fuel delivery system is effective in delivering fuel with only a small fraction of the original fuel volume left as water in the fuel container."

While the trend toward passive techniques is becoming an attractive choice for driving small DMFCs, the above-mentioned passive techniques focus mainly on one aspect in the DMFC, namely fuel delivery. Fuel storage, $CO_2$ release, water and thermal management, and orientation-independent operation are some of the other unresolved issues in such systems. In designing a complete power system, these issues must also be addressed. The present invention provides a solution for these problems.

SUMMARY OF THE INVENTION

The purpose and advantages of the present invention will be set forth in and apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a fuel cell, such as a direct methanol fuel cell (DMFC) including an anode, a cathode and a polymer electrolyte membrane located between the anode and cathode gas diffusion backing layers.

In accordance with one aspect of the invention, a DMFC is provided that uses methanol for its fuel. Preferably, methanol is supplied by a fuel reservoir, which contains either liquid methanol or a highly concentrated methanol solution. The fuel is transported from the fuel reservoir to an evaporation pad, located in an anode chamber of each fuel cell, by way of a fuel conduit that can include a wick.

In accordance with a further aspect of the invention, a fuel cell is provided that incorporates a heat transfer system coupled with an evaporation pad. The system works by increasing the temperature of the fuel (e.g., liquid methanol or methanol solution) in the evaporation pad the resulting fuel vapor is supplied to the anode. As the temperature is increased, condensation of water vapor on the evaporation pad is avoided. The heat transfer system may employ an electrical heater or a heat transfer element for recovering waste heat from the fuel cell or from the fuel cell-powered electronic device. Alternatively, the system may be coupled with a catalytic burner. In accordance with another aspect of the invention, the heat transfer system can also use micro heat pipes to accommodate the space and size constraints of the fuel cell. In accordance with still a further aspect of the invention, two or more of the above-described techniques can be combined to heat the evaporation pad.

In accordance with still another aspect of the invention, a thermal-fluids management system for a fuel cell is provided, which can utilize passive approaches for one or more of air breathing, water management, and $CO_2$ release. An air filter, attached to the outer surface of the cathode, can be adapted and configured to be permeable to air and impermeable to liquid and airborne environmental contaminants such as dust and other particular matter. Water formed within the fuel cell can be managed passively. This can be accomplished, for example, through a combination of controlled fuel vaporization, use of an air deep filter, and use of a hydrophobic micro-porous sub-layer bonded to the cathode catalyst that effectively repels liquid from the cathode and into the membrane electrolyte. These functions maintain water within the membrane and at the anode portion of the fuel cell even when strictly neat methanol is used as the fuel. Carbon dioxide management techniques are also employed to remove carbon dioxide from the anode portion of the fuel cell with minimal loss of methanol fuel.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

The present invention is illustrated by way of example, and not limitation, in figures of the accompanying drawings in which:

FIG. 1 depicts MTI Microfuel Cells Inc.'s technology for fuel delivery.

FIG. 7 depicts a passive water management system for DMFCs.

FIG. 12 depicts different electrical heating configurations provided by the present invention.

FIG. 13 depicts different waste heat recovery arrangements provided by the present invention.

DETAILED DESCRIPTION OF THE PREFERRED EMBODIMENT

Figure 1A:
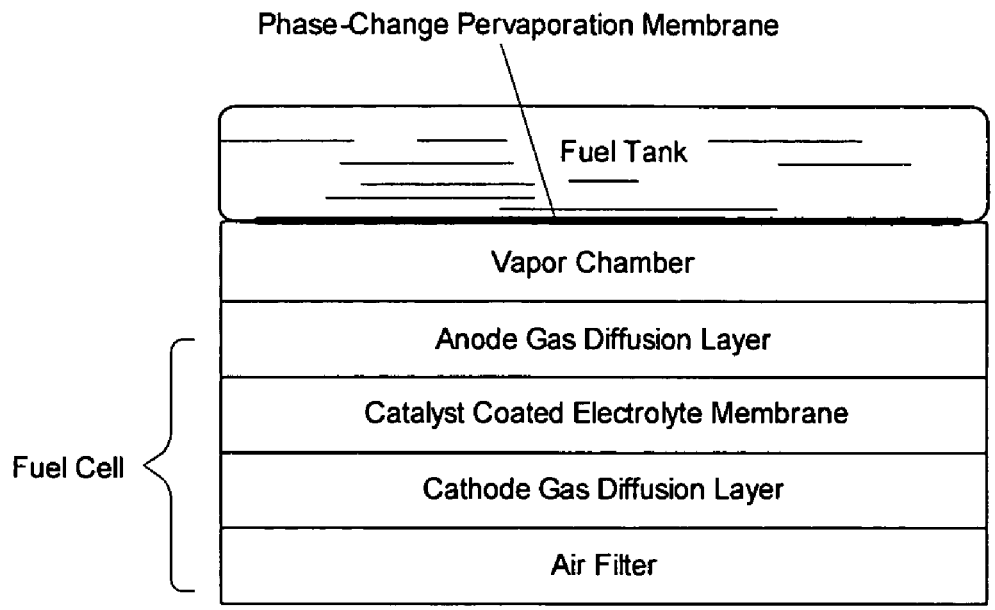
FIG. 1A depicts the phase-change pervaporation membrane technology.
Figure 1B:
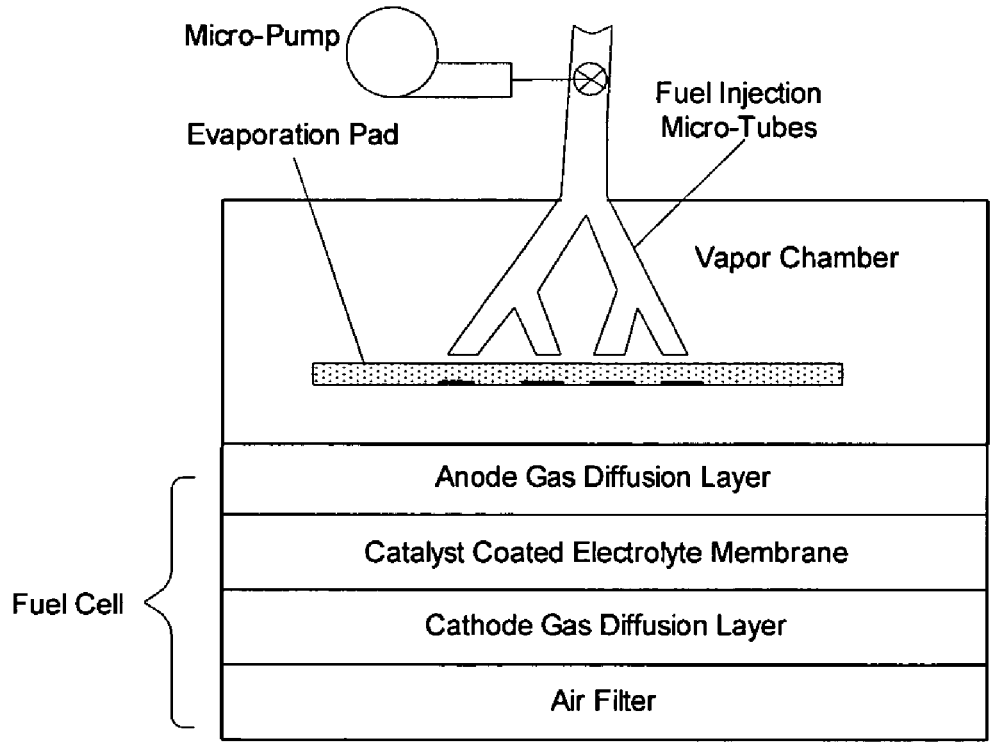
FIG. 1B depicts the active liquid fuel injection technology.

Reference will now be made in detail to the present preferred embodiments of the invention, examples of which are illustrated in the accompanying drawings. The method and corresponding steps of the invention will be described in conjunction with the detailed description of the system.

The devices and methods presented herein may be used for different types of fuel cells using different kinds of fuels. The present invention is particularly well suited for direct methanol fuel cells (DMFCs).

The present invention provides a fuel delivery and thermal-fluids management subsystem for a fuel cell system. For purposes of illustration, herein illustrative embodiments of the invention are depicted in connection with a DMFC system. The fuel used in the DMFC is preferably neat methanol or an aqueous methanol solution.

It should be understood, however, that it is within the scope of the present invention for the system and method for fuel delivery and thermal-fluids management to be readily used with other fuels that are compatible with fuel cell systems. Thus, as used herein, the terms "fuel", "fuel reactant", and "fuel mixture" shall include methanol, ethanol, formic acid, or combinations thereof and aqueous solutions thereof and other carbonaceous fuels that are suitable for use in a small fuel cell system.

For purposes of illustration and not limitation, as embodied herein, a thermal fluid management system for a small DMFC is provided. DMFCs are operated with a water/methanol mixture at the anode and with air at the cathode. The electrochemical reactions are listed as follows:

At the anode, oxidation of methanol takes place:

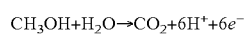

$$CH_3OH+H_2O \rightarrow CO_2+6H^++6e^- \qquad (1)$$

And the oxygen is reduced at the cathode according to:

(2)

The overall reaction in the cell is

(3)

Fluids involved in DMFC operation are:
Reactants: $CH_3OH$, $H_2O$, $O_2$
Byproducts: $CO_2$, $H_2O$ As can be seen from the above equations, water is needed for the reaction at the anode. However, there is a net production of water in the overall reaction. This means that a DMFC can self-supply water, wherein water produced at the cathode can be reused at the anode.

The purpose of the Thermal-Fluids Management System (TFMS) illustrated herein is to transport all the aforementioned fluids properly in a fuel cell, such as a small DMFC. In accordance with various embodiments of the invention, the TFMS is preferably configured and adapted to achieve a number of goals passively. For example, a fuel cell can be provided that can passively supply fuel, such as neat methanol, to the cell with uniform distribution across the cell. In accordance with another aspect, the TFMS can be adapted and configured to achieve passive transport of water within the cell from the cathode (air) side to the anode (fuel) side. In the case of a DMFC, the TFMS can act to store neat methanol and water in the cell, if desired.

In accordance with still another aspect of the invention, the TFMS can passively supply oxygen ($O_2$) to the cell with uniform distribution. In accordance with a preferred embodiment, the TFMS can passively releases $CO_2$ out of the cell. In accordance with an even more preferred embodiment, the passive $CO_2$ release is achieved while losing negligible amounts of water and fuel from the anode chamber.

Preferably, fuel cells made in accordance with the present invention work efficiently and with high stability in various physical orientations. For example, fuel cells such as small DMFCs are usually used as portable power sources, requiring the cell to work with high stability in any direction. In accordance with another embodiment, the TFMS controls methanol concentration in the anode catalyst layer.

Figure 3:
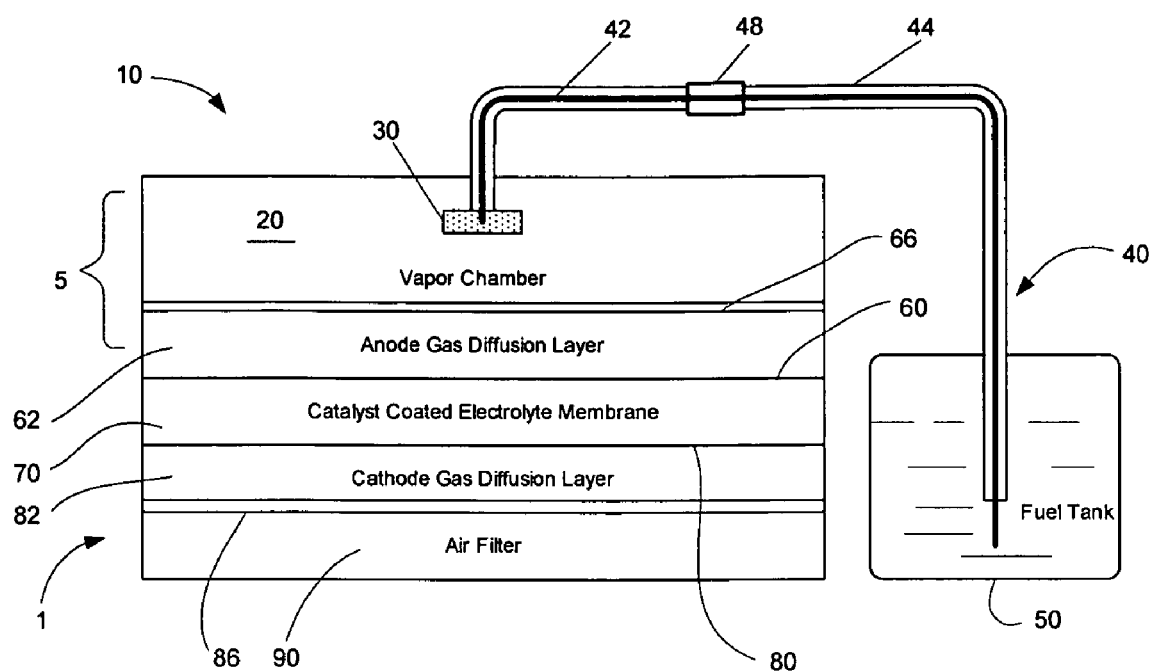
FIG. 3 depicts a vapor fuel delivery system made in accordance with the present invention without a heated evaporation pad.

For purposes of illustration and not limitation, as embodied herein and as depicted in FIG. 3, a fuel cell system 10 is provided. Alternative embodiments of fuel cell systems provided in accordance with the invention, or aspects thereof, are also described in FIGS. 4-15. As depicted in FIG. 3, fuel cell system 10 includes an anode portion 5 including an anode chamber 20, an evaporation pad 30 disposed in the anode chamber 20 and an anode 60 proximate an anode gas diffusion layer 62. The evaporation pad 30 is adapted and configured to cause fuel to evaporate into the anode chamber 20. A fuel pathway 40 is also provided, wherein the fuel pathway 40 is adapted and configured to transport fuel from a fuel source 50 to the evaporation pad 30. The fuel cell system further includes a catalyst coated electrolyte membrane 70, a cathode 80 proximate a cathode gas diffusion layer 82 and an air filter 90.

In accordance with one aspect of the invention, a fuel cell system is provided that can passively supply fuel.

For purposes of illustration and not limitation, a fuel delivery system is provided for a fuel cell including a liquid fuel thermal-wicking dispenser. For purposes of brevity, this system is abbreviated herein as "LFTWD". As depicted in FIG. 3, in accordance with this embodiment of the invention, a fuel cell system 10 is provided wherein fuel, such as liquid methanol, is introduced through a wick structure 42 disposed in a sleeve tube 44, for example, in fuel pathway 40, to an evaporation pad 30 in anode chamber 20. Hydrocarbon fuel, such as methanol vapor, condenses at the anode 60 and mixes with water to provide a dilute methanol/water mixture at the anode. Water is supplied from the cathode side internally through the membrane 70, across the thickness of the cell, eliminating the need for water collection and pumping. This new fuel cell architecture provides an attractive combination of easily controllable neat methanol feed and passive water self-supply. Furthermore, the simplicity of the hardware is compatible with miniaturized portable fuel cell systems that can be cost-effectively fabricated and operated with promising stability and duration.

In the anode chamber 20, methanol can evaporate from the evaporation pad 30 and water can evaporate from the anode diffusion layer 62. Therefore, a miscible binary vapor mixture is present in the anode chamber 20 with some non-condensable gases such as air and carbon dioxide. As the methanol evaporates, the evaporation pad 30 may be cooled below the saturation temperature of the binary vapor mixture. If this happens, the less volatile component (water) in the system will condense first on the surface of the evaporation pad. In other words, water condenses more rapidly than methanol does, therefore, methanol in the evaporation pad will become diluted. The temperature of the liquid in the evaporation pad must be increased in order to continue the evaporation process. In the subsequent evaporation process, methanol preferentially evaporates from the binary liquid system in the evaporation pad. As a result, water tends to accumulate on the evaporation pad 30.

Wick 42 can be made from a variety of materials, including for example porous PTFE, polyethylene and polypropylene. If desired, as depicted in FIG. 3, the fuel feed rate can be actively controlled by providing an actuator 48 that can be located proximate to or even inside of wick 42 to control the cross sectional area of wick 42. Naturally, as the cross section of wick 42 is decreased, the flow rate of fuel through wick 42 will decrease. Actuator 48 can take on a variety of forms, including for example a Micro Electro Mechanical Systems (MEMS) actuator, among others.

Fuel reservoir 50 can take on a variety of forms. In accordance with one embodiment, reservoir 50 is a removable replaceable fuel cartridge. Advantageously, removal of the cartridge can act as an on/off mechanism for the fuel cell. Likewise, the aforementioned MEMS actuator can also act as an on-off switch for the fuel cell.

In practice, a fuel cell such as a DMFC must be operated at variable temperatures. If the operational temperature of the DMFC is reduced, the temperature drops in the anode chamber 20. If the vapor mixture in the evaporation chamber is sufficiently supercooled, a fog may be formed and fall on the evaporation pad 30. This also causes water accumulation on the evaporation pad 30.

Figure 2:
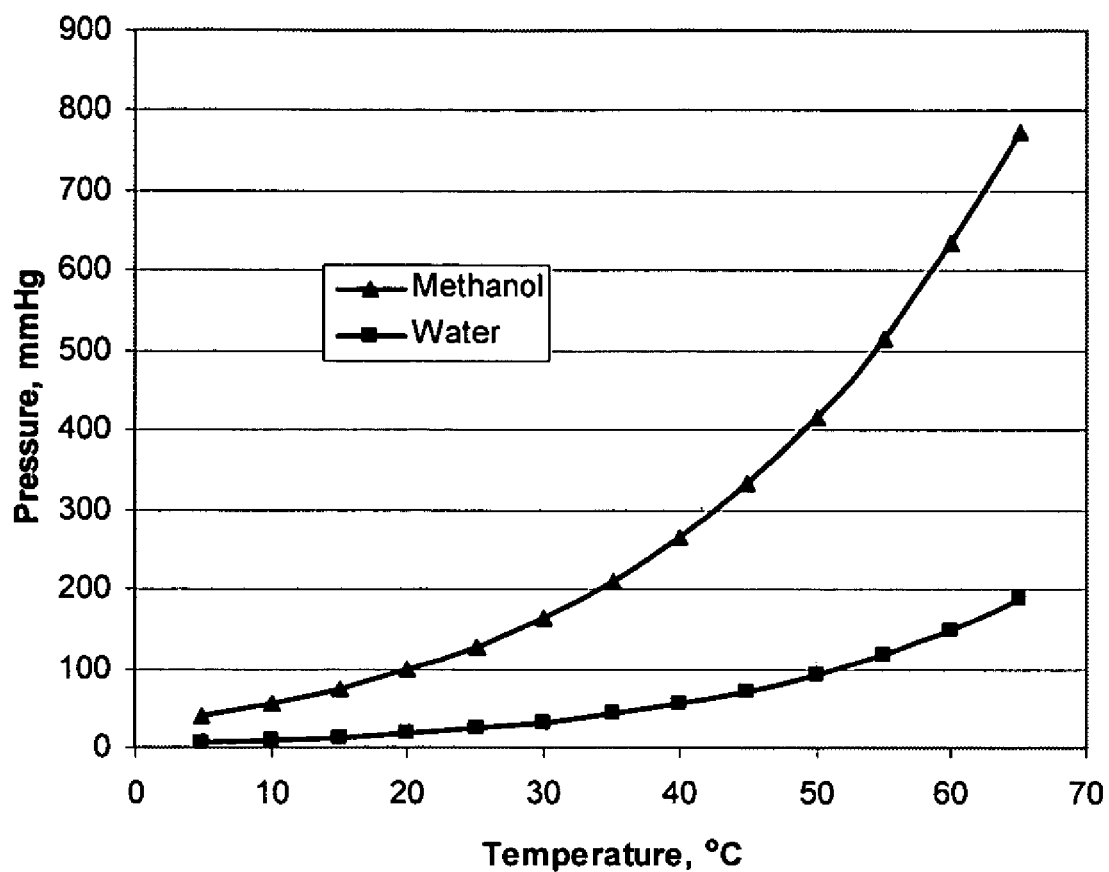
FIG. 2 depicts a plot of methanol and water vapor pressure with temperature changes.

FIG. 2 depicts the evaporative behavior of methanol and water. As is depicted, methanol vapor pressure increases exponentially with increases in the temperature of the liquid fuel source; therefore, small temperature increases can cause significant increases in methanol vapor pressure, resulting in greater production of methanol vapor in the anode chamber 20. Secondly, methanol vapor pressure is much higher than that of water in the temperature range of portable fuel cell applications such as DMFC applications (operation temperature usually lower than 60° C.); the saturation pressure of methanol/water solution is dominated by methanol partial pressure. Provided the total saturation vapor pressure (methanol and water vapor) exceeds the aqueous methanol solution $P_{tot}$, as described by Raoult's law, the total vapor pressure is: $P_{tot}=(1-x)P_M+xP_W$, where x is the mole fraction of water in the solution, and $P_W$ and $P_M$ are pure water and methanol saturate vapor pressure, respectively. From this equation, it is clear that water accumulation in the evaporation pad 30 will reduce methanol vapor pressure linearly. As more and more water accumulates, the rate of methanol evaporation from the evaporation pad will be diminished.

As the evaporation process occurs in the evaporation pad 30, its temperature is decreased. Evaporation pad 30 will absorb heat from surrounding gases by convection, which is generally a bottleneck in the evaporation processes. Additional heat may be transferred to the evaporation pad in order to: (1) heat the surface of the evaporation pad, (2) heat the liquid in the evaporation pad, or (3) remove water in the evaporation pad. To avoid vapor condensation, the surface of the evaporation pad 30 should be heated to a temperature above the dew point. Increasing the temperature of the liquid in the evaporation pad 30 can increase the production of the fuel vapor. Also, water can be easily vaporized at an elevated temperature if it does exist in the evaporation pad.

Additional heat can be added to the evaporation pad by several approaches, such as an electronic device, reuse of waste heat, and use of heat produced from catalytically burning of fuel.

Figure 4:
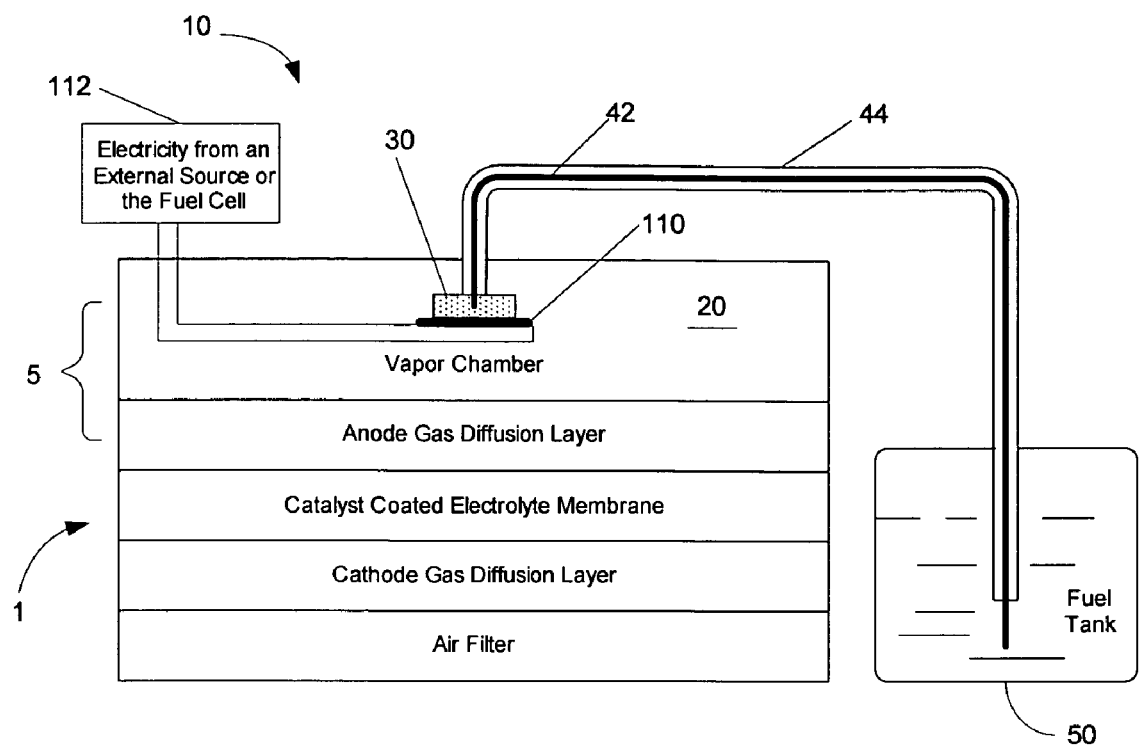
FIG. 4 depicts a vapor fuel delivery system with an evaporation pad heated by an electrical heater made in accordance with the present invention.

As depicted in FIG. 4, the electrical heating approach is relatively simple in implementation. For example, a small, thin film heater 110 can be inserted in the evaporation pad 30 as depicted in FIG. 4 and in FIG. 12A. The electrical source 112 to drive the heater 110 can be either an external source or the fuel cell itself.

Figure 12A:
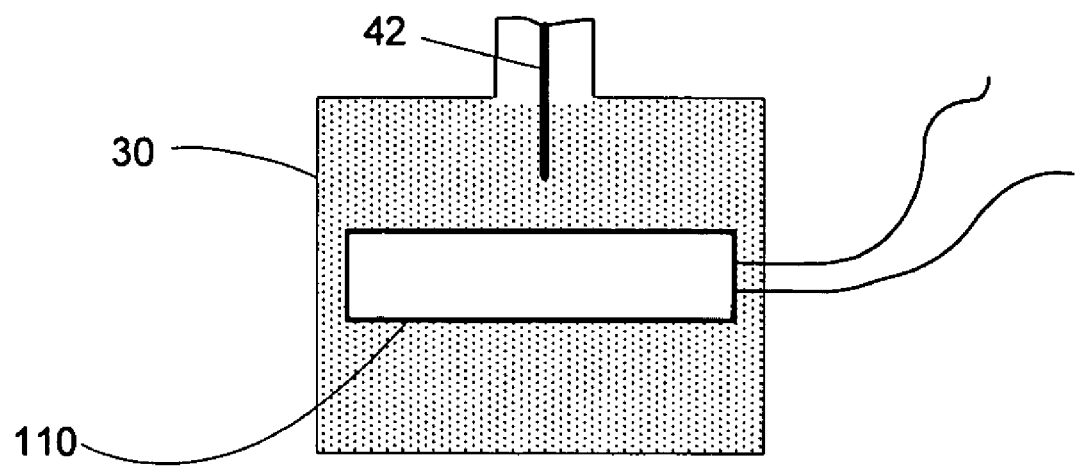
FIG. 12A depicts a film electrical heater.
Figure 12B:
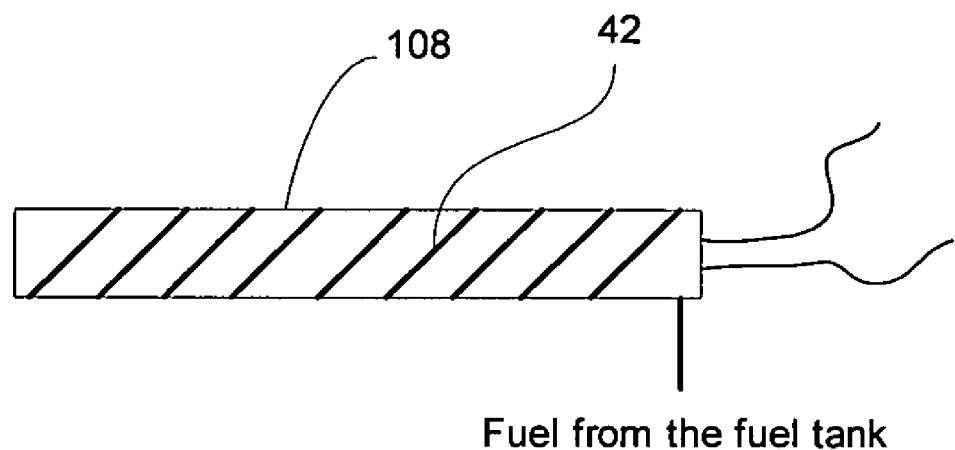
FIG. 12B depicts a cartridge electrical heater.

Additionally or alternatively, as depicted in FIG. 12B, a cartridge heater 108 can be provided and fuel can be preheated by wrapping fuel delivery wick 42 about cartridge heater 108.

To calculate the electrical energy needed in this process, it can be assumed that the electrical power source 112 provides heat for only methanol vaporization. The methanol latent heat of vaporization is the dominating term in the process, which is 37.5 kJ/mol at 25° C. The total energy released from 1.0 mol of methanol is about 726.6 kJ under standard conditions at 25° C. The electric energy provided to vaporize methanol is equivalent to approximately 5% energy content in methanol, which also means that the system conversion efficiency is reduced at least 5%.

In accordance with another embodiment of the invention, this fuel cell efficiency loss is eliminated by reusing the waste heat from the fuel cell or the electronic device powered by the fuel cell. In a passive DMFC being operated at ambient temperature, the electrodes' temperatures can reach 30-50° C. and the system conversion efficiency is typically less than 30%. Therefore, more than 70% of energy content in methanol is converted into heat and released to the ambient air, which is sufficient for vaporizing methanol even with low waste heat utilization efficiency. As waste heat is generated in the fuel cell electrodes, it is also the hottest region in a fuel cell such as a passive DMFC.

Figure 5:
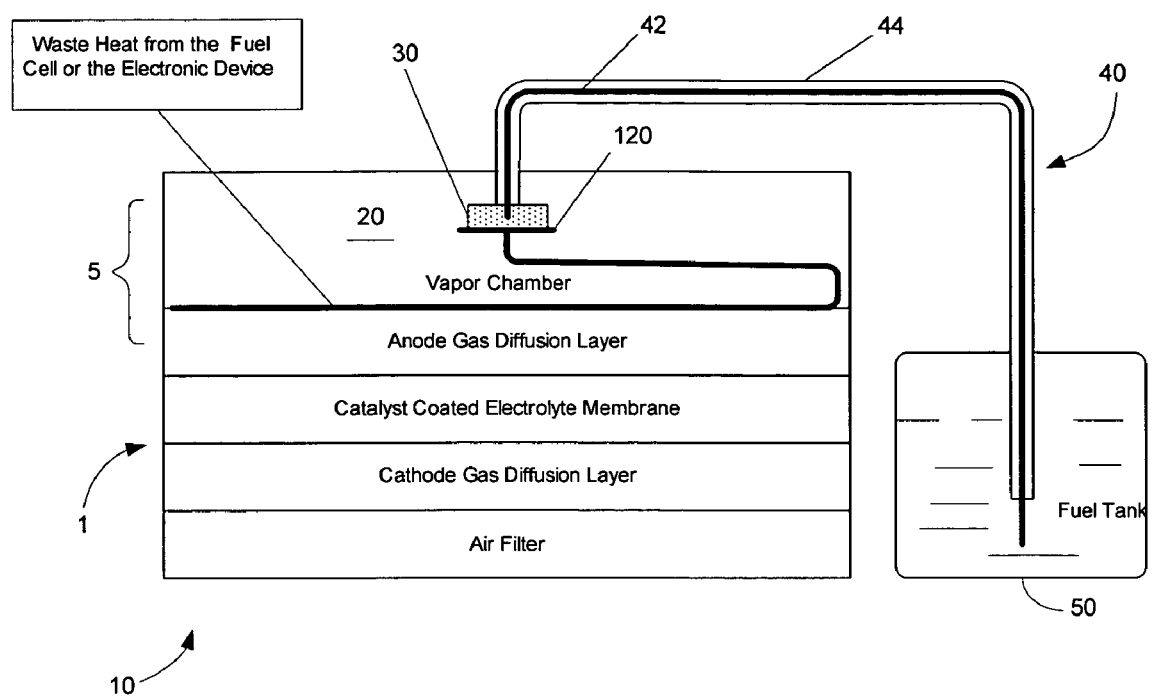
FIG. 5 depicts a vapor fuel delivery system with an evaporation pad heated by the fuel cell and/or the electronic device made in accordance with the present invention.
Figure 13A:
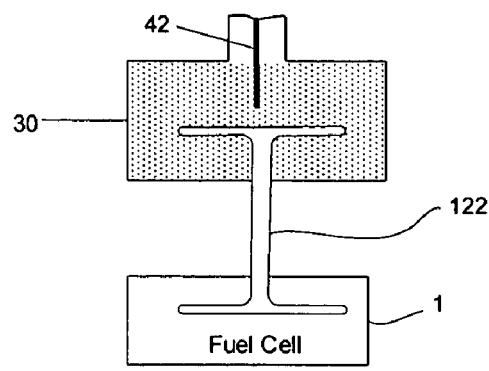
FIG. 13A depicts using a heat spreader for recovering heat from the fuel cell.

As disclosed in FIGS. 5 and 13, a passive heat transfer structure 120 including, for example, various combinations of heat spreaders 122 or heat pipes 124 are utilized to collect the waste heat from the anodic electrode 60 and then transfer it to the evaporation pad 30. It is most advantageous to transfer enough heat to vaporize methanol with a minimal temperature gradient.

Figure 13B:
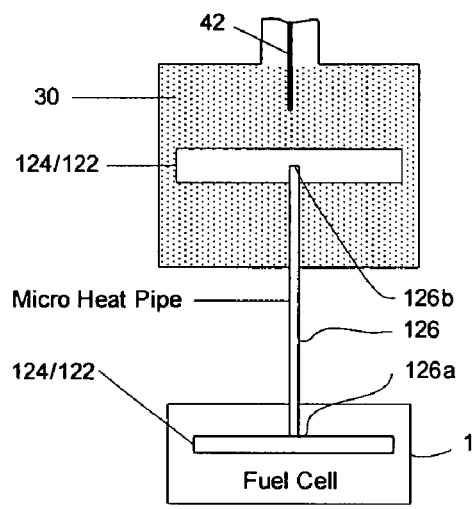
FIG. 13B depicts using micro heat pipes and/or heat spreaders to recover heat from the fuel cell.

It is also possible to use a heat transfer system using multiple micro heat pipes 126 to transport heat from the fuel cell to the evaporation pad 30 (See FIG. 13B). One end 126a of the multiple micro heat pipes 126 is in close contact with the fuel cell, whereas the other end 126b is attached to a thermal spreader 122 or a flat heat pipe 124, which is embedded in the evaporation pad 30.

A heat pipe is essentially a passive heat transfer device with an extremely high effective thermal conductivity. The heat pipe in its simplest configuration is a closed, evacuated cylindrical metal vessel with internal walls lined with a capillary structure or wick that is saturated with a working fluid. The advantage of using a heat pipe over other conventional methods is that large quantities of heat can be transported through a small cross-sectional area over a considerable distance with no additional power input. Furthermore, design and manufacturing simplicity, small end-to-end temperature drops, and the ability to control and transport high heat rates at various temperature levels are unique features of heat pipes.

Figure 13C:
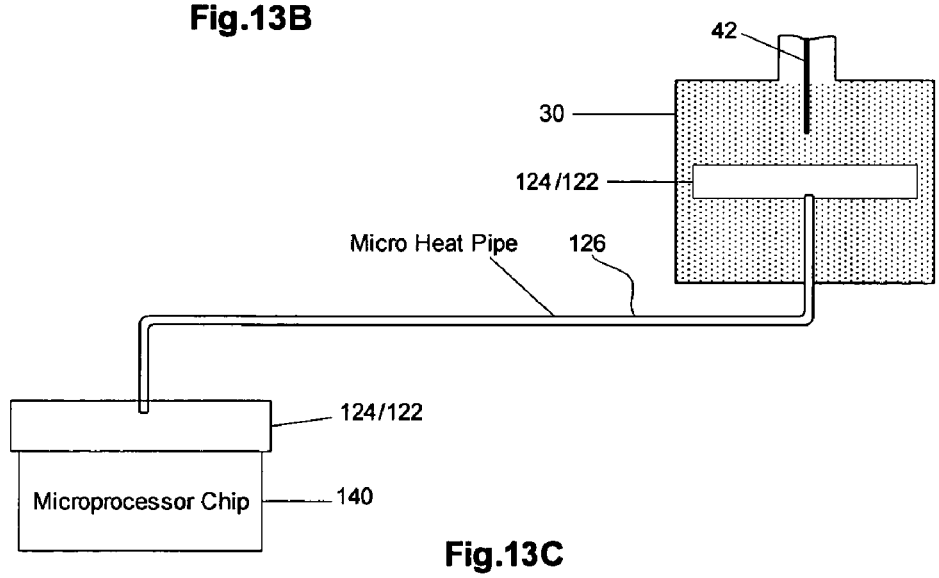
FIG. 13C depicts using micro heat pipes and/or heat spreaders to recover waste heat from the electrical device.

As depicted in FIG. 13C, micro heat pipes 126 can be used to transport heat from a electronic device (e.g., a notebook computer, especially a notebook computer powered by a DMFC) to the evaporation pad 30. Thus, the heat generated by the electronic devices powered by the fuel cell can be reused in the fuel cell system 10 to vaporize liquid fuel. The waste heat from the electronic device 140 is usually generated at a temperature greater than 80° C., which provides a greater temperature gradient for the heat transfer process. In such an application, it is desirable to maintain junction temperatures below 125-150° C. A thermal spreader 122 or a flat heat pipe 124 is attached to a waste heat source 140 (e.g., a microprocessor chip) for heat absorption. The multiple micro heat pipes 126 are attached to the thermal spreader or the flat heat pipe. They assist with the dissipation of heat generated by the waste heat source and with release of the heat to the evaporation pad 30 through a thermal spreader 122 or a flat heat pipe 124 which are embedded in pad 30 (See FIG. 13C).

Figure 6:
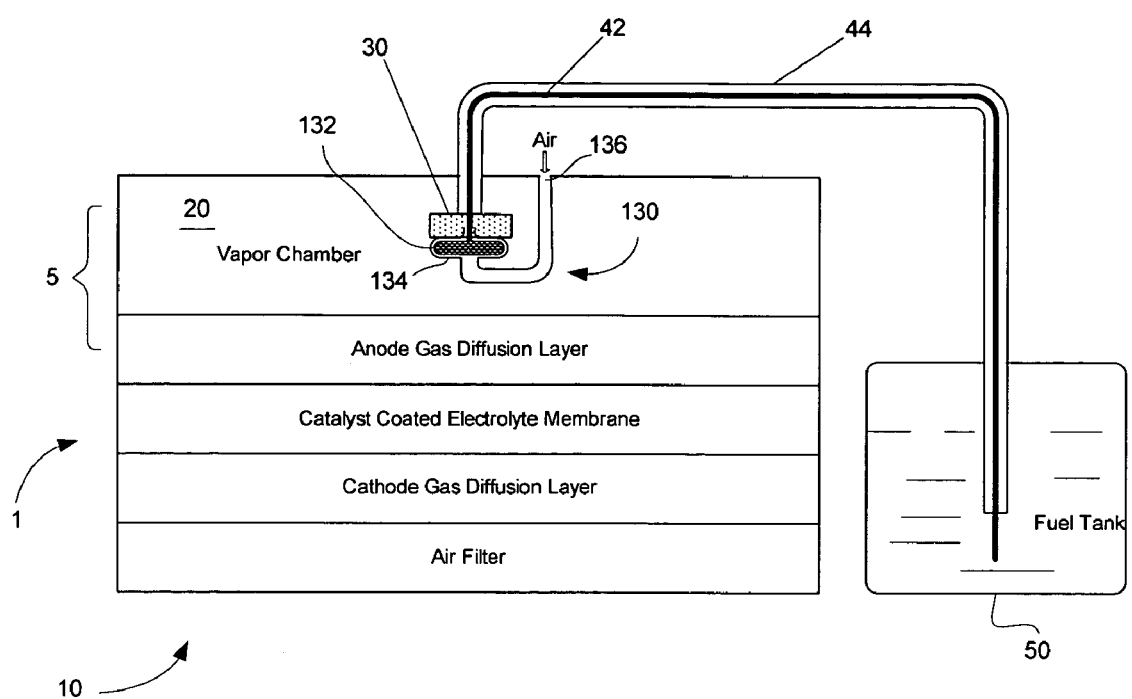
FIG. 6 depicts a vapor fuel delivery system with an evaporation pad heated by a catalytic burner made in accordance with the present invention.
Figure 14:
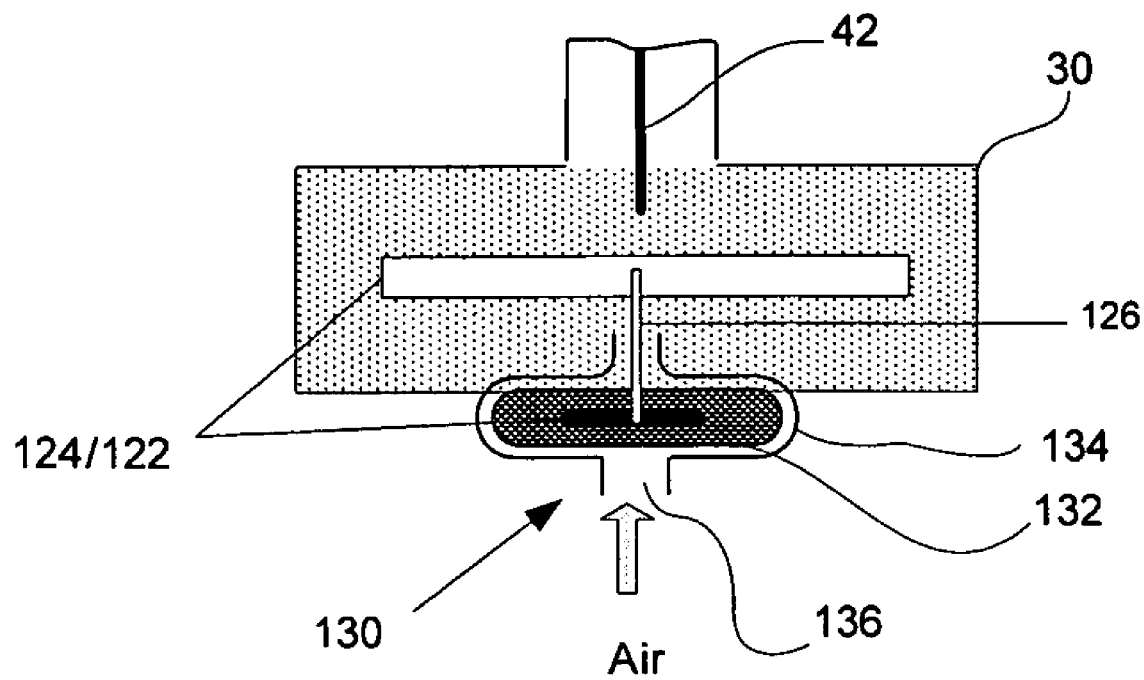
FIG. 14 depicts an embodiment of the invention wherein the evaporation pad is heated by catalytically burning of fuel.

FIGS. 6 and 14 are schematic side views of embodiments of a fuel cell system 10 (or a portion thereof) that uses a low temperature catalytic burner 130 for heating the evaporation pad 30. The fuel (such as methanol) diffuses through a wick structure (such as wick structure 42, as depicted) and is exposed to a catalyst that oxidizes the fuel as air is provided. The burner includes a catalyst-coated porous medium 132, which defines a catalyzed area. A combustion chamber 134 provided over the catalyzed area includes an aperture 136 to restrict oxygen access, and consequently to control the catalytic reaction.

A number of catalysts can be used to oxidize methanol in the presence of oxygen. By way of illustration, and without limitation, platinum and platinum/ruthenium blends are typical materials whose uses as catalysts are well known. In addition, other metallic catalysts may be used to allow the air oxidation of methanol. A variety of porous media can be used as the catalyst carrier in the burner. Carbon cloth coated with a Pt/Ru catalyst was used in an initial qualitative experiment. The catalyst (Pt/Ru) was combined with a PTFE solution and thoroughly stirred. Carbon cloth was immersed in the mixture for 5 minutes and dried in an oven at 300° C. for 1 to 2 hours. With limited air access, the temperature of the catalyzed area can be controlled in the range of 30° C. to 80° C.

In accordance with a further aspect of the invention, a fuel cell having a passive water management system is provided.

Water at the cathode can arise from a variety of sources. For example, water is created by the electro-chemical reaction at the cathode as shown in Eq. 2. In addition, water can arise from the electro-osmotic drag and diffusion of water through the membrane from the anode to the cathode. In addition, water can be created at the cathode by the chemical reaction of air and methanol, wherein the methanol permeates through the membrane from the anode to the cathode (methanol crossover).

Figure 7A:
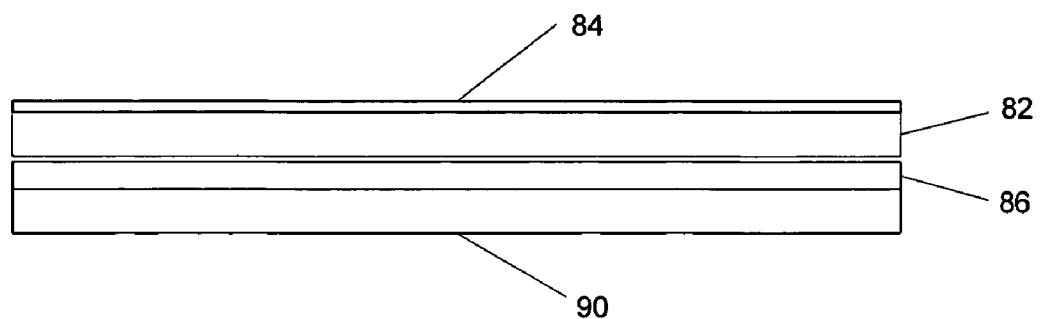
FIG. 7A depicts an air breathing DMFC cathode structure for water recirculation and air filtration made in accordance with the present invention.

For purposes of illustration and not limitation, a novel way of managing the water loss from the DMFC and the water flux through the proton exchange membrane is shown in FIG. 7A. A thick gas diffusion layer 82, including for example LT-2500W and LT-1400W obtained from E-TEK, is used at cathode side. It also functions as a liquid-water barrier layer. A micro porous sub-layer 84 is commonly formed on the gas diffusion layer by coating and bonding carbon particles together with PTFE compounds. The sub-layer 84 has micro pores with a pore diameter between about 1.0 and 0.1 μm in order to block liquid water. These pores allow oxygen from the ambient air to pass through to the cathode GDL, and they allow a limited amount of water in vapor form to escape out of the cell. However, the pores are too small and hydrophobic to allow liquid water to pass through the GDL. A hydraulic pressure, which is developed in the region between the cathode catalyst layer and the GDL, will force some liquid water to the anode side and some liquid water to the cathode GDL 82. This process depends on the properties of the GDL. If the GDL 82 has a smaller average pore size and/or a higher water contact angle, a higher hydraulic pressure is generated and more water is forced back to the anode side of the fuel cell. A metal mesh layer 86 is also provided for electrical collection purpose.

Figure 7B:
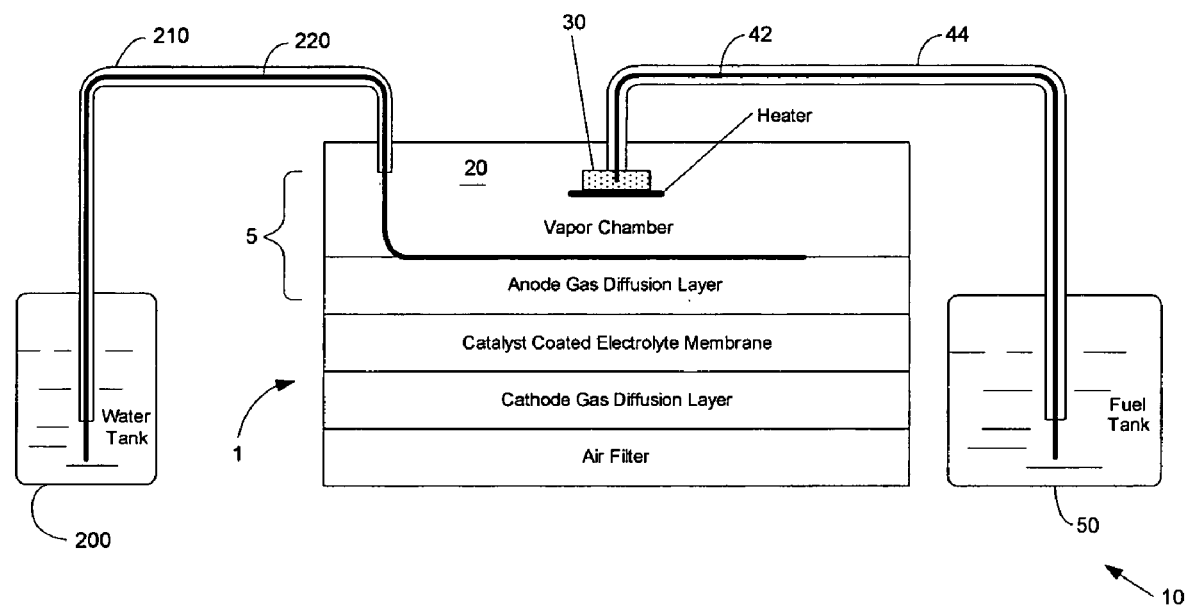
FIG. 7B depicts a DMFC with passive water and fuel delivery means made in accordance with the present invention.

By way of further example, an additional embodiment of a passive water delivery means is shown in FIG. 7B. This system was found to be helpful in improving the system's operational reliability. Specifically, water is transferred from a water reservoir 200 through a water flow path 210 including a wick 220 to the anode 60. The water wick can be a hydrophilic porous material, as is known in the art.

The disclosed cathode filter 90, which may include a layer of porous hydrophobic medium, helps to reduce the escape of water vapor while ensuring sufficient oxygen supply. Thus, water mass is balanced within the cell to allow neat, or highly concentrated, methanol feed without active external recirculation.

While operating the fuel cell in an air-breathing mode provides an advantageous mechanism for supplying air to the cathode 80, it also poses challenges for fuel cell operation. First, too much air access can quickly dry out the membrane 70 and cause the fuel cell to cease producing useful output power. On the other hand, if insufficient air access is allowed, performance suffers due to oxygen reduction reaction deficiencies, and cross-over methanol begins to wet the cathode structure, further limiting performance. Second, air access also affects system start-up from dry conditions. When a dry cell slowly starts to produce water (both from methanol electro-oxidation at the anode and chemical oxidation at the cathode) performance slowly improves as the level of hydration and temperature increases. Too much air access will evaporate the water and hinder the start-up process. Moreover, airborne particulates may damage the cathode as the fuel cells are exposed to air.

The air filter used in the present invention is a highly hydrophobic material. In addition to filtering air, the filter also serves as a waterproof layer for the cathode. Therefore, the air filter can also prevent water contamination. In experiments, in a water immersion test, when the fuel cell was immersed in water; the system stops producing power due to insufficient air. However, since water couldn't penetrate through the air filter 90, the cathode still remained "dry." Once the fuel cell was pulled out of the water, the fuel cell produced power instantly. In experiments, two kinds of air filters 90 were used. The first one was a porous polyethylene sheet (mean pore size 80-120 μm, thickness: 0.08"). The other was a porous PTFE sheet (pore size: 25 μm, thickness: 1/16").

In further accordance with the invention, a fuel cell system is provided with passive carbon dioxide management.

For purposes of illustration and not limitation, as embodied herein, during operation of the cell, $CO_2$ is produced at the anode 60 and accumulates in the anode chamber 20. $CO_2$ must be released to the ambient air when the pressure of the anode chamber is increased to a certain level.

Figure 15:
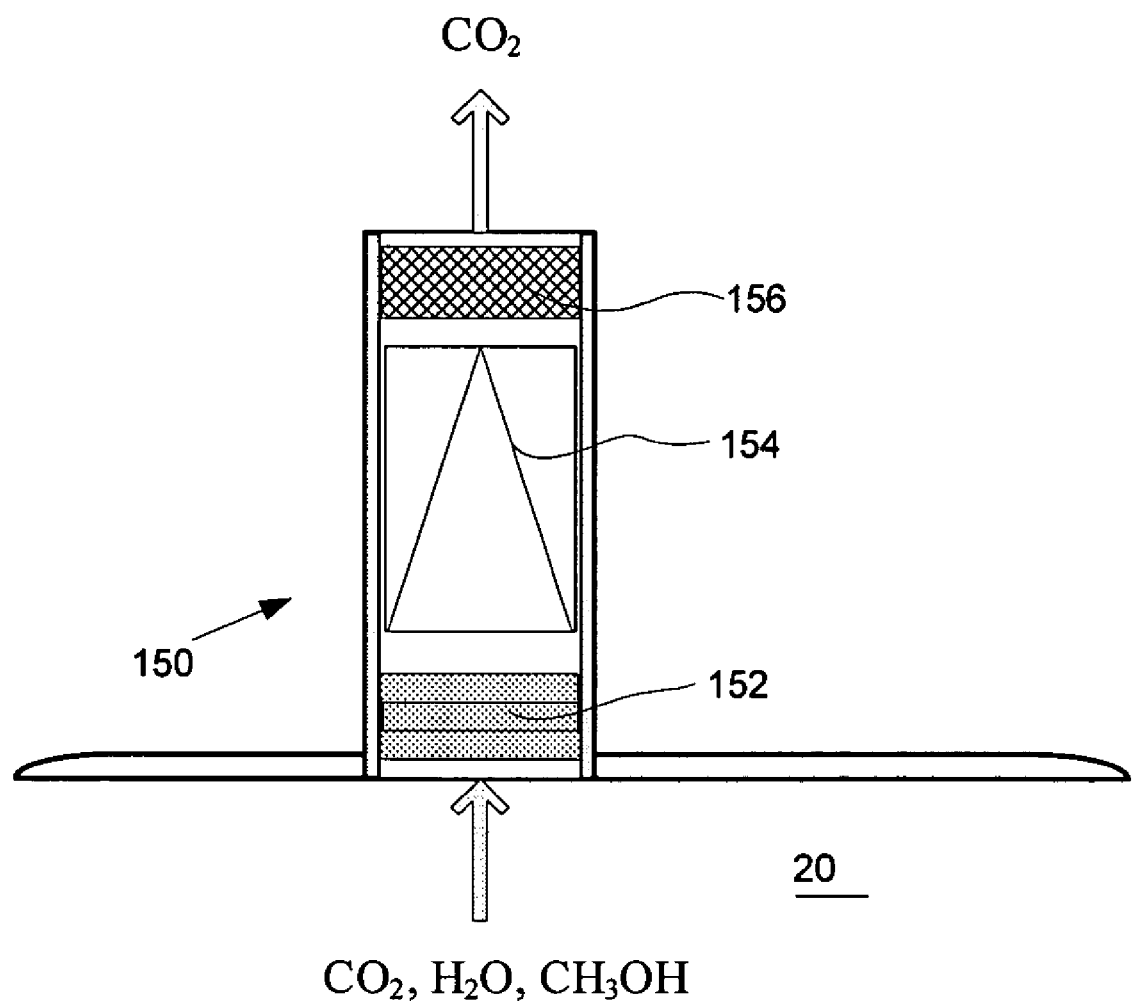
FIG. 15 depicts a check valve that can be placed in fluid communication with the anode chamber of a fuel cell as described herein to facilitate passive removal of carbon dioxide.

As depicted in FIG. 15, a valve system 150 can be placed in fluid communication with anode chamber 20 to facilitate release of carbon dioxide. Once the pressure in the anode chamber 20 reaches a predetermined level, a check valve 154 within valve system 150 opens for a short time to release $CO_2$. A semi-gas-permeating membrane is also needed to prevent the loss of liquid fluids (methanol and water) in the process of releasing $CO_2$. As depicted, hydrophobic porous layers 152 are used to block condensable gases such as water and methanol vapor. Since $CO_2$ is a non-condensable gas, it will penetrate through the porous media. A trace amount of methanol will be burned in the catalyst coated porous medium 156 before it leaves the system. The hydrophobic porous layers 152 can be made of extruded PTFE with pore diameters less than 1 μm (usually between 0.1 to 0.6 μm). The catalyst coated porous medium 156 used in the present invention can be a porous metal medium or carbon cloth coated with Pt black.

Examples

A fuel cell was built, including a Nafion® 117 membrane, platinum-clad niobium-expanded mesh, gas diffusion layers, and fiberglass fixtures. The structure was similar to the fuel cell depicted in FIG. 3. The gas diffusion layer (GDL) 82 at the cathode side was thick gas diffusion medium (available from E-TEK). Carbon cloth without treatment was used as the GDL 62 at the anode side. The cell 1 was assembled by sandwiching (from anode to cathode) metal mesh 66, carbon cloth 62, a Nafion 117 membrane 70 (with catalyst layers at each side), thick gas diffusion layer 82, and metal mesh 86 between two fiberglass fixtures. The two fiberglass fixtures were tightened by using 12 screws. This DMFC 1 has a square active area of 9.0 $cm^2$. A vapor chamber 20 constructed of Teflon was attached to the fuel cell through the use of bolts and nuts on the four corners of the fuel cell.

Figure 8:
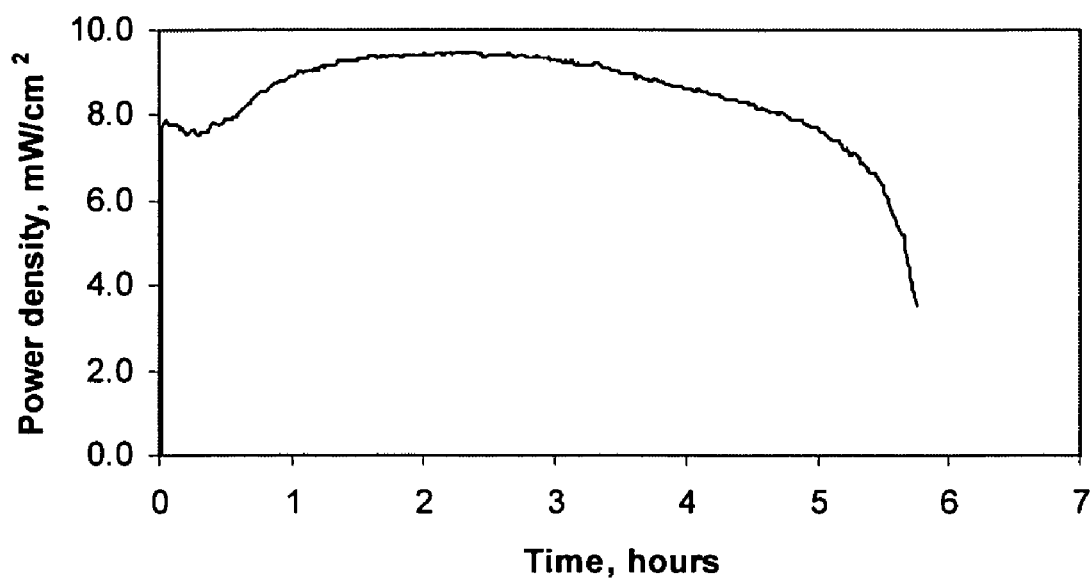
FIG. 8 depicts typical power density vs. time curves for the fuel cell system without a heated evaporation pad as shown in FIG. 3.

A fuel tank 50 was used containing methanol fuel. A wick structure 42 connected fuel tank 50 to evaporation pad 30, which is placed in the anode chamber 20 of each fuel cell. Methanol was vaporized in the vapor chamber 20 and supplied to the anode 60 in a manner similar to that depicted in FIG. 3. A typical power density versus time curve is shown in FIG. 8 for operation of the unit after methanol is filled in the tank. The power density increased to about 9.0 $mW/cm^2$ and remained at this level for 1 to 2 hours. Then the power density dropped gradually and went to zero at about 6 hours. Some liquid remained in the fuel tank and the evaporation pad was saturated with liquid, suggesting water vapor condensed in the evaporation pad. When this happened, the fuel vapor pressure dropped and reduced the rate at which fuel could evaporate from the evaporation pad. Thus, the rate of fuel delivery would gradually drop and the evaporation pad would gradually fill with a mixture of methanol and water. As methanol vapor pressure decreased in the anode chamber, the fuel transfer limitation occurred at the anode catalyst layer and resulted in the power density decrease.

The results described above were noted for cells operating at relatively steady temperatures. In many practical applications, a fuel cell is more likely to experience rapid temperature changes. To observe the fuel cell behavior under such operating conditions, in one experiment the room temperature was increased from 20° C. to 28° C. in about 10 minutes and then kept constant. In this case, the cell attained an even higher power density than before. In another experiment, the room temperature was decreased from 28° C. to 20° C. in about 10 minutes. The cell power density decreased quickly to zero, demonstrating that water condensed on the evaporation pad 30 surface when the cell experienced a sudden temperature decrease.

Previous runs had shown evidence of water condensation on the surface of the evaporation pad 30. This condensation eventually reduced the fuel evaporation rate. To compensate, approaches were used in the subsequent experiments to heat the evaporation pad to a higher temperature (above the dew point of a water and methanol vapor mixture in the anode chamber).

Figure 9:
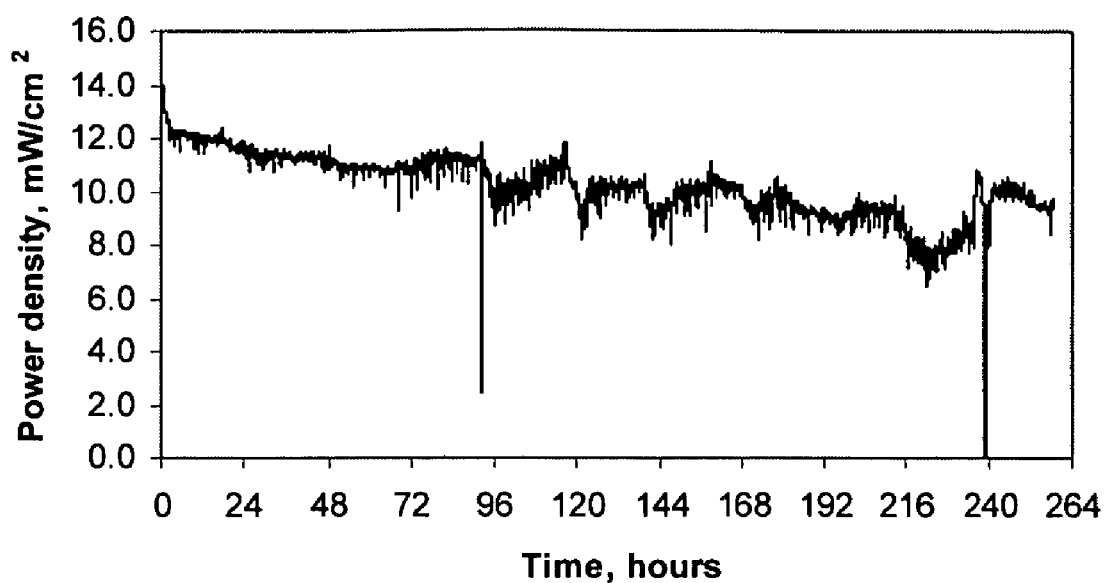
FIG. 9 depicts typical power density vs. time curves for the fuel cell system with an electrical heater to heat the evaporation pad as shown in FIG. 4.

As depicted in FIG. 4, an electrical film heater 110 was attached to the evaporation pad 30 and a primary battery (size D and OCV of 1.5 Volts) was used as the power source 112. In a long-term test the cell power output became very stable, as depicted in FIG. 9. Specifically, FIG. 9 shows the stable power density over more than 10 days with several fuel recharges. Two low spikes in FIG. 9, one near 96 hours and the other near 240 hours, represent points at which the fuel supply was interrupted because of the depletion of methanol in the fuel tank. After recharging the fuel tank, the power output was resumed.

Figure 10:
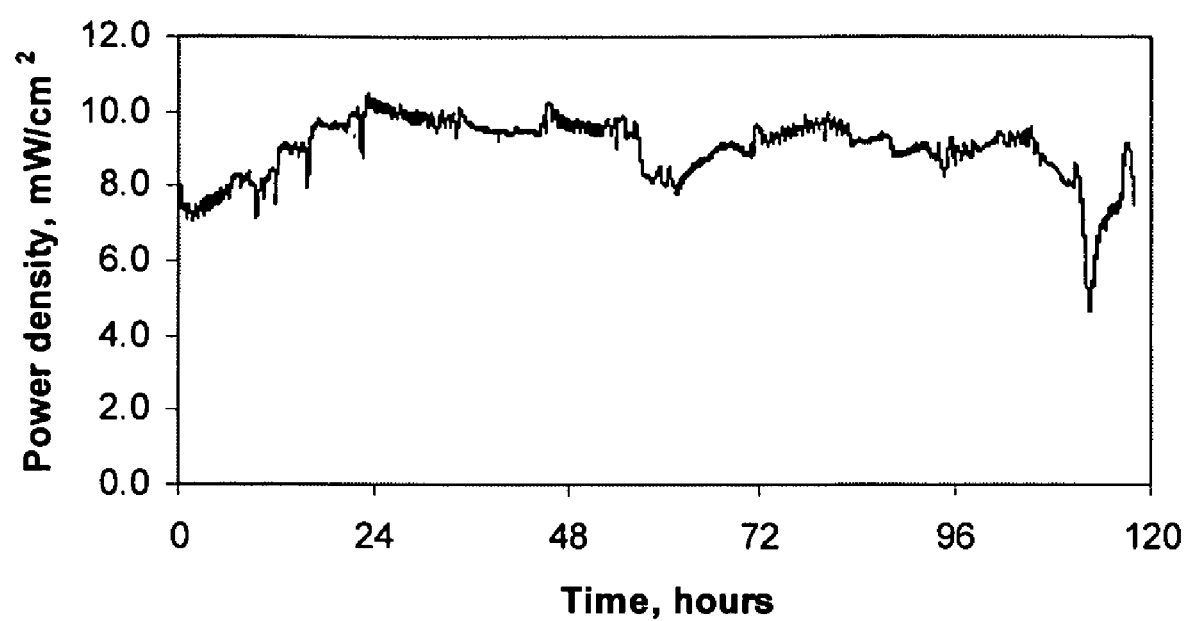
FIG. 10 depicts typical power density vs. time curves for the fuel cell system with a waste heat recovery system to heat the evaporation pad as shown in FIG. 5.

A second heating mode was also used as shown in FIG. 5. In this mode, a heat spreader 122 was used to heat the evaporation pad 30 through re-use of the waste heat from the cell 1. In this case, the fuel vapor is produced by self-heating. The fuel cell system 10 can self-supply water by reusing the water presented at the cathode 80. The combination of these features resulted in a simple direct methanol system. The performance curve of the system is shown in FIG. 10. Even though at this point the power density was not particularly high (~9.0 mW/cm$^2$), the completely passive system (no operator or system controls intervention) operated with promising stability and duration.

Figure 11:
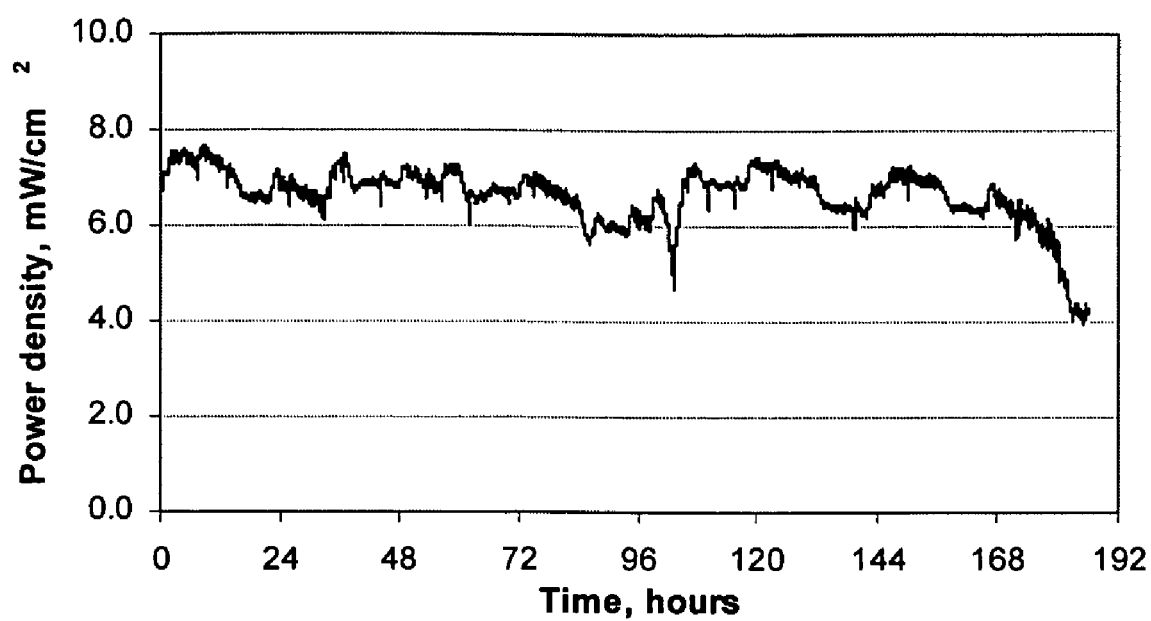
FIG. 11 depicts typical power density vs. time curves for the fuel cell system having a catalytic burner to heat the evaporation pad as shown in FIG. 6.

A third heating mode as shown in FIG. 6 was also used. A low temperature methanol burner was used to heat the evaporation pad 30 of a DMFC 1. The fuel cell was operated under constant current mode (I=28.0 mA/cm$^2$). The power output is shown in FIG. 11. The power density was about 7.0 mW/cm$^2$. The fuel cell provided stable power for 186 hours with several refuelings. The evaporation pad 30 temperature varied between 35° C. and 40° C., which was higher than the vapor temperature in the anode chamber 20. The ambient temperature was kept around 25° C. The internal resistance was relatively stable (30 to 35 mOhm) in the whole testing course, indicating that the membrane was well hydrated). The testing results show that the vapor fuel delivery system provided a reliable fuel supply with the aid of the low temperature burner.

A qualitative comparison was made between DMFCs made in accordance with the teachings herein and other competitive technologies. This comparison is summarized in Table 1, below. As can be seen, fuel cells made in accordance with the teachings herein can overcome many problems inherent in prior art systems.

Table 2 below summarizes and compares different approaches described herein for heating evaporation pad 30. Disclosed herein are three exemplary heating methods, namely, electrical heat, waste heat recovery, and catalytic burning. The system may employ one or any combination of these systems. Moreover, the exemplary heating methods specifically illustrated are not considered to be limiting. Indeed, any suitable heating system can be employed and is within the scope and the spirit of the present invention.

The methods and systems of the present invention, as described above and shown in the drawings, provide for a fuel cell with superior properties. It will be apparent to those skilled in the art that various modifications and variations can be made in the device and method of the present invention without departing from the spirit or scope of the invention. Thus, it is intended that the present invention include modifications and variations that are within the scope of the appended claims and their equivalents.

The below listed references are incorporated by reference herein in their entireties.

REFERENCES

U.S. Patent Documents

| | |
|---|---|
| 6,737,181 | Beckmann, G., Brown, E.J. "Methods and Apparatuses for a Self-regulating Gas Displacement Pump for a Fuel Cell System." |
| 6,727,016 | Bostaph, J.W., Marshall, D.S. "Direct Methanol Fuel Cell Including a Water Recovery and Re-circulation System and Method of Fabrication." |
| 6,696,189 | Bostaph, J.W., Koripella, C.R., Fisher, A.M. "Direct Methanol Fuel Cell System Including an Integrated Methanol Sensor and Method of Fabrication." |
| 6,632,553 | Corey, J.A., Beckmann, G. "Methods and Apparatuses for Managing Effluent Products in a Fuel Cell System." |
| 6,596,422 | Ren, X.M. "Air Breathing Direct Methanol Fuel Cell." |

Other Publications

Blum, A., Duvdevani, T., Philosoph, M., Rudoy, N., Peled, E. (2003) "Water-neutral Micro Direct Methanol Fuel Cell (DMFC) for Portable Applications," *Journal of Power Sources*, Vol. 117, pp. 22-25.

Luharuka, R., Wu, C. F., Hesketh, P. J. (2004) "Design, Fabrication, and Testing of a Near Constant Pressure Fuel Delivery System for Miniature Fuel Cells," *Sensors and Actuators A*, Vol. 112, pp. 187-195.

Becerra, J. J., Kovacs, F. W., Ren, X. M. (2005) "Fuel Substance and Associated Cartridge for Fuel Cell," U.S. Patent Pub. No. 2005/0084720.

Chandak, M. V., Lin, Y. S., Ji, W., Higgins, R. I. (1998) "Sorption and Diffusion of Volatile Organic Compounds in Polydimethylsiloxane Membranes," *Journal of Applied Polymer Science*, Vol. 67, pp. 165-175.

Chang, H. (2003) "Technical and Commercial Issues of DMFC: 5 W for Mobile Devices and 100 W for Portable Power," 5th Annual International Symposium-Small Fuel Cells for Portable Power Applications, May 7-9, Hyatt Regency, New Orleans, La., USA.

Hockaday, R. G., Patrick, S. T., Marc, D. D., Carlos, J. N., Heathcliff, L. V., Vazul, L. L. (2003a) "Diffusion Fuel Ampoules for Fuel Cells," U.S. Pat. No. 6,630,266.

Hockaday, R. G. (2003b) "Small Diffusion Driven Fuel Cells," The Knowledge Foundation's 5th Annual International Symposium—Small Fuel Cells for Portable Power Applications, May 7-9, Hyatt Regency, New Orleans, La., USA.

Faghri, A. (1995) *Heat Pipe Science and Technology*, Taylor & Francis, New York.

Faghri, A., Zhang, Y. (2006) *Transport Phenomena in Multiphase Systems with Phase Change*.

Guo. Z., Faghri, A., Miniature DMFCs with passive thermal-fluids management system, Journal of Power Sources, Received 7 Feb. 2006; received in revised form 2 Mar. 2006; accepted 3 Mar. 2006, available online Apr. 18, 2006 at 10.1016/j.jpowsour.2006.03.013.

Guo. Z., Faghri, A., Development of planar air breathing direct methanol fuel cell stacks, Journal of Power Sources, Received 6 Feb. 2006; received in revised form 10 Mar. 2006; accepted 10 Mar. 2006, available online Apr. 24, 2006 at 10.1016/j.jpowsour.2006.03.045.

Manning, M. P., Modi, A., Ren, X. M., Guleserian, L. A. (2005) "Fuel Container With Reticulated Material," U.S. Patent Pub. No. 2005/0081924.

Ren, X. M., Gottesfeld, S. Becerra, Hisch, R. S. (2004a) "Fluid Management Component for Use in a Fuel Cell," U.S. Patent Pub. No. 2004/0062980.

Ren, X. M., Kovacs, F. W., Shufon, K. J., Gottesfeld, S. (2004b) "Passive Water Management Techniques in Direct Methanol Fuel Cells," U.S. Patent Pub. No. 2004/0209154.

Ren, X. M., Becerra, J. J., Gottesfeld, S., Kovacs, J. S. (2005) "Controlled Direct Liquid Injection Vapor Feed for a DMFC," U.S. Patent Pub. No. 2005/0170224.

Thrasher, S., Rezac, M. E. (2004) "Transport of Water and Methanol Vapors in Alkyl Substituted Poly(norbornene)," *Polymer*, pp. 2641-2649.

TABLE 2

Comparison of different heating technologies used in disclosed embodiments.

| Technology | Technology Features | Advantages |
| --- | --- | --- |
| I. Without heating | The evaporation pad absorbs heat from the surrounding gases. | a). Very simple system design<br>b). Stable operation under low power densities |
| II. Electrical heater | The evaporation pad is heated by an electrical heater. | a). Simple system design<br>b). Easy control for fuel feeding rate<br>c). Vapor feed system is very stable as sufficient heat provided |
| III. Recovery of waste heat | The evaporation pad is heated by reuse of waste heat from the fuel cell itself and/or from the electronic device. | a). High overall system efficiency.<br>b). Vapor feed system is very stable as high temperature waste heat provided |
| IV. Catalytic burner | The evaporation pad is heated by catalytically burning of methanol. | a). The overall system efficiency is slightly reduced<br>b). Very stable vapor feed system<br>c). Very stable fuel cell operation |

TABLE 1

Selected important passive fuel delivery technologies for portable fuel cells.

| Technology | Technology Features | Advantages | Disadvantages |
| --- | --- | --- | --- |
| I. LCMSF | a). Uses low concentrated methanol solution | a). Very simple system design<br>b). Low methanol crossover | a). Very large fuel reservoir for extended operation |
| II. LMC-PEM Toshiba, Hitachi, Samsung | a). Based on the polymer membrane technology<br>b). Uses highly concentrated methanol solution<br>c). Modifies polymer electrolyte membrane to reduce methanol crossover<br>d). Optimizes the structure of the fuel cell's electrodes to reduce methanol concentration near the catalyst layer<br>e). Utilizes methanol concentration gradient to deliver the fuel to the anode catalyst layer | a). Simple system design<br>b). Liquid fuel delivery | a). No commercially available low methanol crossover electrolyte membrane thus far<br>b). Methanol crossover for high concentrations and mass transfer limitation for low concentrations<br>c). Unreliable fuel supply over the large methanol concentration range<br>d). Difficulties associated with recharge of fuel<br>e). Difficulties associated with the operation in freezing temperatures |
| III. PCPM MTI, Manhattan | a). Based on the pervaporation membrane separation technology<br>b). Uses neat methanol<br>c). Vaporous fuel feeding<br>d). Produces the fuel vapor without heating<br>e). Utilizes a pervaporation membrane, or other suitable membrane, that effects a phase change from liquid methanol in the fuel reservoir to methanol vapor in the anode chamber | a). Simple system design for micro system<br>b). Utilizes commercially available polymer electrolyte membranes<br>c). Low methanol crossover<br>d). Possible operation in freezing temperatures | a). As water condenses on the surface of the methanol pervaporation membrane, the rate of fuel delivery would gradually drop<br>b). Unreliable operation over a large temperature range<br>c). Difficulties associated with extending to larger fuel cell systems<br>d). Loss of methanol fuel in the $CO_2$ releasing process<br>e). Difficulties with fuel flow rate control |
| IV. LFTWD (Disclosed herein) | a). Based on the thermal-fluids technology<br>b). Uses neat methanol<br>c). Vaporous fuel feeding<br>d). Produces the fuel vapor with heating<br>e). Utilizes an electrical heater<br>f). Reuses waste heat from the fuel cell and/or the electronic device, which is powered by the fuel cell itself<br>g). Uses a catalytic burner to heat the evaporation pad<br>h). Utilizes hybrid heating technology of (e), (f) and (g) | a). Simple system design<br>b). Utilizes commercially available polymer electrolyte membranes<br>c). Low methanol crossover<br>d). Expandable to larger systems<br>e). Very reliable operation over the large temperature range<br>f). Simple fuel flow rate control<br>g). Functional in freezing temperatures<br>h). Versatile portable fuel cell platform suitable for various volatile organic fuel feed fuel cells (e.g., formic acid fuel cells)<br>i). Small loss of fuel in $CO_2$ releasing process | |

What is claimed is:

1. A fuel cell comprising:
   a) an anode portion including:
      i) an anode
      ii) an anode chamber;
      iii) an evaporation pad disposed in the anode chamber, the evaporation pad adapted and configured to cause fuel to evaporate into the anode chamber; and
      iv) a fuel pathway adapted and configured to transport fuel from a fuel source to the evaporation pad;
   b) an electrolyte membrane having a first portion operably coupled with the anode; and
   c) a cathode operably coupled to a second portion of the electrolyte membrane; and
   d) a heater in thermal communication with the evaporation pad, the heater adapted and configured to raise the temperature of the evaporation pad to facilitate the evaporation of fuel into the anode chamber, wherein the heater and evaporation pad are in thermal communication by way of at least one heat pipe.

2. The fuel cell of claim 1, wherein the heater is an electrical heater disposed proximate the evaporation pad.

3. The fuel cell of claim 1, wherein the heater directs waste heat from the fuel cell to the evaporation pad by way of a conductor.

4. The fuel cell of claim 1, wherein the heater directs waste heat from a component external of the fuel cell to the evaporation pad.

5. The fuel cell of claim 1, wherein the heater includes a catalytic burner.

6. The fuel cell of claim 5, wherein the catalytic burner uses fuel from the same source used to operate the fuel cell to heat the evaporation pad.

7. The fuel cell of claim 1, wherein the evaporation pad is heated by the heater to a temperature above the dew point of a fuel mixture of methanol and water in the anode chamber in order to avoid water vapor condensation on the evaporation pad.

8. The fuel cell of claim 1, wherein the heater includes one or more of (i) an electrical heater disposed proximate the evaporation pad, (ii) a heater that directs waste heat from the fuel cell to the evaporation pad by way of a conductor, (iii) a heater that directs waste heat from a component external of the fuel cell to the evaporation pad and (iv) a catalytic burner.

* * * * *

UNITED STATES PATENT AND TRADEMARK OFFICE
CERTIFICATE OF CORRECTION

Page 1 of 1

PATENT NO.       : 7,625,649 B1
APPLICATION NO.  : 11/441427
DATED            : December 1, 2009
INVENTOR(S)      : Amir Faghri and Zhen Guo It is certified that error appears in the above-identified patent and that said Letters Patent is hereby corrected as shown below:

In the specification:

Insert at Column 1, line 4 -- STATEMENT REGARDING FEDERALLY SPONSORED RESEARCH
This invention was made with government support under Grant No. 0514840 awarded by the National Science Foundation (NSF). The government has certain rights in the invention. --

Signed and Sealed this
Thirteenth Day of September, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,625,649 B1 | Page 1 of 1 |
| APPLICATION NO. | : 11/441427 | |
| DATED | : December 1, 2009 | |
| INVENTOR(S) | : Amir Faghri and Zhen Guo | |

It is certified that error appears in the above-identified patent and that said Letters Patent is hereby corrected as shown below:

In the specification:

Insert at Column 1, line 4 -- STATEMENT REGARDING FEDERALLY SPONSORED RESEARCH
    This invention was made with government support under Grant No. CTS-0514840 awarded by the National Science Foundation (NSF), and under Grant/Contract No. DAAB07-03-3-K-415 awarded by the Army. The government has certain rights in the invention. --

This certificate supersedes the Certificate of Correction issued September 13, 2011.

Signed and Sealed this
Sixth Day of December, 2011

David J. Kappos
*Director of the United States Patent and Trademark Office*